Sept. 20, 1960 A. D. LA RUE 2,953,753

ENERGY COUPLING AT HIGH FREQUENCIES

Filed Jan. 6, 1955 2 Sheets-Sheet 1

INVENTOR
ALBERT D. LARUE
BY Elmer J. Gorn
ATTORNEY

ENERGY COUPLING AT HIGH FREQUENCIES

INVENTOR
ALBERT D. LA RUE
BY Elmer J. Gorn
ATTORNEY 2,953,753

ENERGY COUPLING AT HIGH FREQUENCIES

Albert D. La Rue, Lexington, Mass., assignor to Raytheon Company, a corporation of Delaware Filed Jan. 6, 1955, Ser. No. 480,178

7 Claims. (Cl. 331—90)

This invention relates to microwave transmitting systems, and particularly to the control of the operating efficiency of a variable frequency microwave generator of the magnetron category.

The invention is characterized by the provision of a magnetron output structure adapted to vary the frequency-coupling characteristic of the power delivering circuit (wave guide or coaxial line) in a manner to improve the output circuit efficiency to a degree that is sufficient to offset losses in the electronic efficiency of the magnetron itself, such as the drop in efficiency that accompanies an adjustment of the operating frequency in the direction of its upper limit.

Stated more specifically, the invention introduces a frequency-sensitive element operating to increase the circuit-coupling efficiency at the high-frequency end of the tuning range and to decrease the circuit-coupling efficiency at the low-frequency end, thus securing the proper degree of coupling at these extremes, as well as at all frequency settings falling therebetween. This frequency-sensitive element is herein shown as taking the form of a phase-changing discontinuity inserted in the output circuit and operating to alter the standing wave ratio by abruptly varying the physical dimensions of the output transmission line and thereby introducing a load mismatch factor serving to change the line abruptly from one characteristic impedance to another. By choosing the location at which to introduce such mismatch so that maximum circuit efficiency is obtained when the magnetron is tuned to its highest frequency, there is assured a constancy of power output over the entire frequency band constituting the tuning range.

When it is attempted to apply an inductance, or L-C, tuning technique (as contrasted with a purely inter-vane capacitance tuning procedure) to a multi-cavity type of magnetron, one is confronted with a power-coupling problem that is not present when only capacitance tuning is employed. In tubes using "C tuning" only, the power output vs. frequency curve is relatively flat, whereas in tubes using inductance tuning or L-C tuning, the power output (due to tank circuit losses) tends to be lower at the high operating frequencies, and higher at the lower operating frequencies, with some units showing a variation as great as 50% between the two extremes. Such fluctuation in power output is quite objectionable in that it tends to promote over-heating of the cathode and anode at the higher frequencies, and moding at the lower frequencies.

Since the operating efficiency of a magnetron is the product of the electronic efficiency of the tube multiplied by the output circuit efficiency ($n_t=n_e \times n_c$) and since electronic efficiency falls off as the frequency approaches the top of the tuning range, it follows that constancy of output can be maintained only by increasing output circuit (that is, output-coupling) efficiency in substantially direct proportion to increases in the operating frequency, so that the product, $n_e \times n_c$, will remain constant at all tuning positions. The frequency-responsive circuit control method and means herein described has been found to be operative to achieve the desired constancy of output by interposing in the initial output stage an impedance-mismatching, or discontinuity, element whose phase-changing (hence coupling efficiency-lowering) effect varies in inverse ratio to the frequency setting, thus balancing or offsetting other oppositely-acting factors and thereby serving to maintain the desired constancy in the product, $n_e \times n_c$, governing the power output value. The method constituting the invention is illustrated in three practical forms, each embodying the invention; one form involving an application to a magnetron with a wave guide output circuit, and the other two embodiments involving coaxial transmission circuits.

Figure 1:
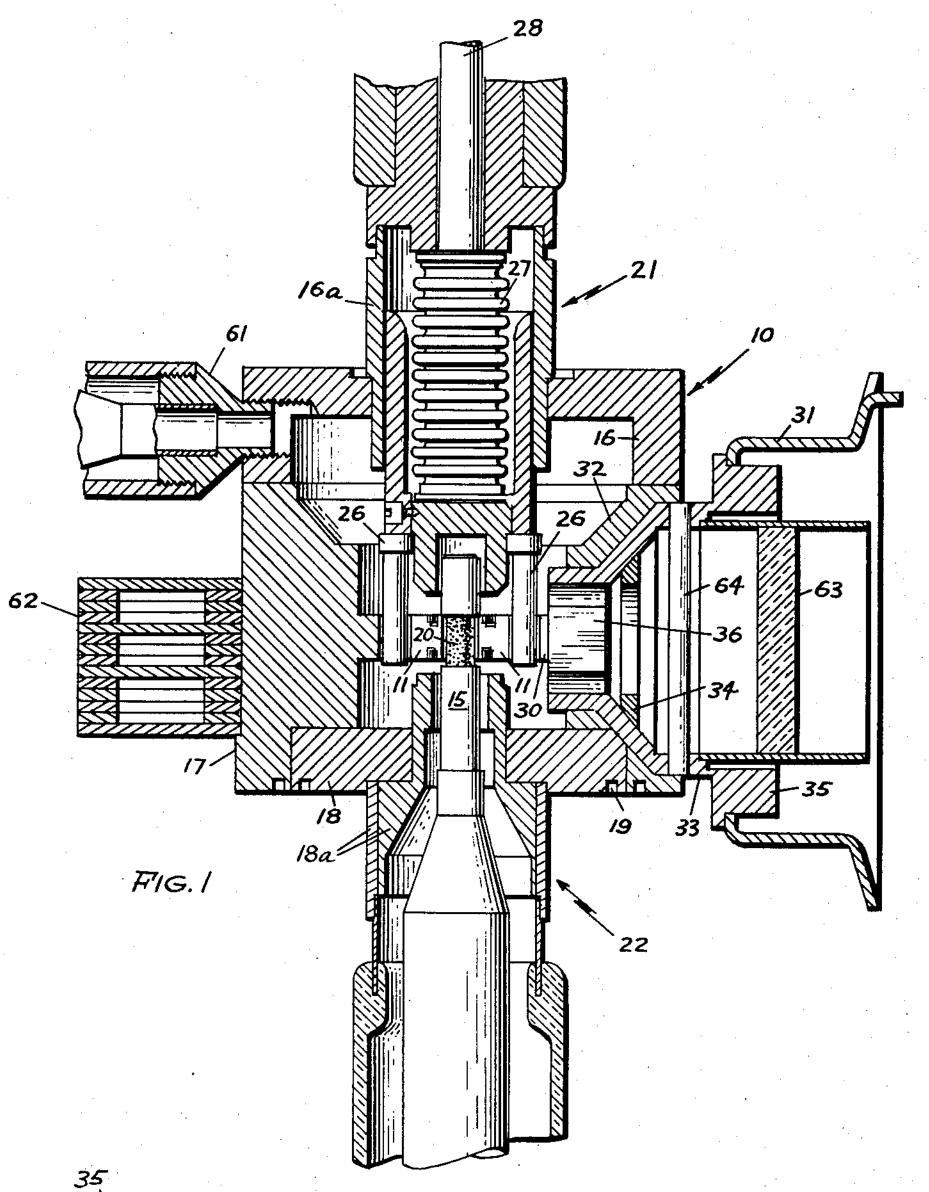
Fig. 1 is a central, longitudinal sectional view of an assembly including an electron discharge device constructed to facilitate inductance tuning, and also including an energy output structure embodying the invention and adapted to respond to inductance (or L-C) tuning in a manner to accomplish the purposes of the invention.

Referring first to Fig. 1, the numeral 10 designates an electrically conductive cylindrical body member, preferably of copper, and numerals 11 designate anode jetties disposed radially of the longitudinal axis of body 10, which jetties (as better shown in Fig. 5) are formed by first perforating the body 10 to form cavities 12 at angular intervals equally spaced and equidistant from the body axis, and then slotting the body to form channels 13 at the radial areas joining the successive cavities 12 to the central opening 14. The jetties 11 thus formed are integral parts of the body 10, and combine therewith to constitute the anode element of the microwave generating means, while the cathode element is constituted by the central rod 15 having the emitting portion 20 reduced in diameter and coated with conventional substance to facilitate electron emission from the surface 20 radially outward to enter the channels 13 and the resonant cavities 12.

Figure 6:
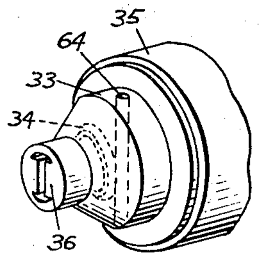
Fig. 6 is a perspective view of the centrally slotted energy directing element constituting the output structure shown in section in Fig. 1.
Figure 5:
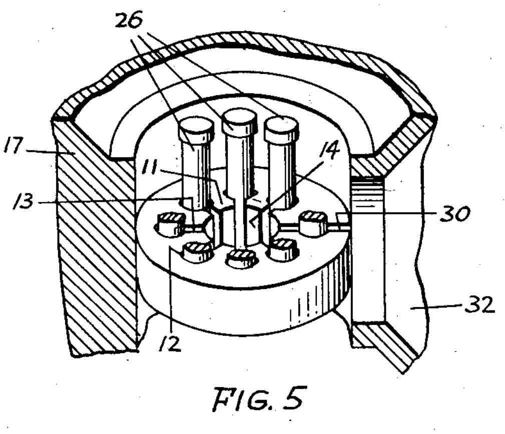
Fig. 5 is an inclined plan view of the anode element, showing also the tuning pins in association therewith.

From cavities 12 the generated oscillating energy passes into the outlet fitting 33 by way of output channel 30 which, as shown best in Fig. 5, is constituted by slotting the body 10 at a radial plane bisecting one of the cavities 12, the slot extending from the cavity to the outer periphery of the body to provide an emergence path for the oscillating output of the magnetron. This emergence path 30 aligns with the central iris-like slot in the first section 36 of the outlet fitting 33 of generally conical contour (see Fig. 6), which fitting 33 registers with the conically recessed portion 32 of the magnetron body. Fitting 33 carries the impedance discontinuity element 34 embodying the invention, and has an outer flanged section 35 of wider diameter for attachment to wave guide support 31.

The impedance discontinuity element 34 (preferably of copper) operates as a load mismatch by introducing, at an appropriate distance beyond the output threshold 36, a region whose characteristic impedance is lower than that of the immediately adjacent regions of the output path. Thus, for example, if the characteristic impedance of the said adjacent regions is 40 to 50 ohms, the region occupied by the discontinuity element 34 (which is shown as ring-shaped, by may assume other contours) will have its characteristic impedance reduced to a value of the order of 15 to 20 ohms. The standing wave ratio introduced is, therefore, on the order of 2:1 VSWR. The linear distance *d* between the point of output junction and the optimum location point for the mismatch element 34 can be arrived at by applying one of the following formulae:

(1) $d=K\lambda$, or (2) $d=K\lambda+0.5\lambda$ where $\lambda$ represents one wave length at a median point in the tuning range, and K is a selection factor (less than 0.5) which will vary from installation to installation according to the physical design considerations encountered, such as the total number of abrupt changes in the over-all path of energy transmission, percentage of transverse area of the path that is occupied by the mismatch element, etc.; however, generally speaking, a spacing of .38 to .40 of one wave length will be found to produce maximum circuit efficiency when the highest tunable frequency is on the order of 3000 megacycles, with correspondingly longer or shorter spacing as the frequency characteristic departs from the 3000 mc. magnitude.

As heretofore noted, the introduction of the phase-changing discontinuity, above described, is especially desirable when inductance tuning or L-C tuning is employed. Fig. 1 shows an inductance tuning structure (not, per se, a part of the invention) in the form of a plurality of ferromagnetic pins 26 equal in number to the number of resonant cavities 12, and movable in unison in relation to said cavities to change the inductance characteristics of the cavities. Any suitable means may be employed for imparting longitudinal adjusting motion to the pins 26. The means illustrated takes the form of a bellows assembly 27 whose movable lower end transmits to pins 26 the raising or lowering motion applied to centrally disposed rod 28. Bellows 27, being fixedly secured at its upper end, also provides hermetic sealing of the oscillation generating space.

Rod 28 and bellows 27 are insertible into the magnetron assembly by way of the central opening in the upper part of a cap element 16 superimposed upon the central section 17 of the body 10, there being also a lower section 18 nested within the lower part of central section 17 and attachable thereto by suitable means such as threads (not shown) inter-engaging along the registering cylindrical surfaces, with the aid of a suitable turning tool insertible into the recesses 19. Elements 16 and 18 also receive the tubular elements **16*a* and 18*a*, respectively, which constitute pole-pieces of the magnetic field-establishing structure which is completed by attachment of the ends of a U-shaped permanent magnet (not shown) to the said pole-pieces 16*a* and 18*a***.

The auxiliary input fitting for introduction of excitation voltage indicated at 61 in Fig. 1, and the jacket 62 through which cooling fluid circulates, may be of conventional design. The same is true of the ceramic window 63 and the window-compensating pin 64 of the wave guide assembly of Fig. 1.

Figure 2:
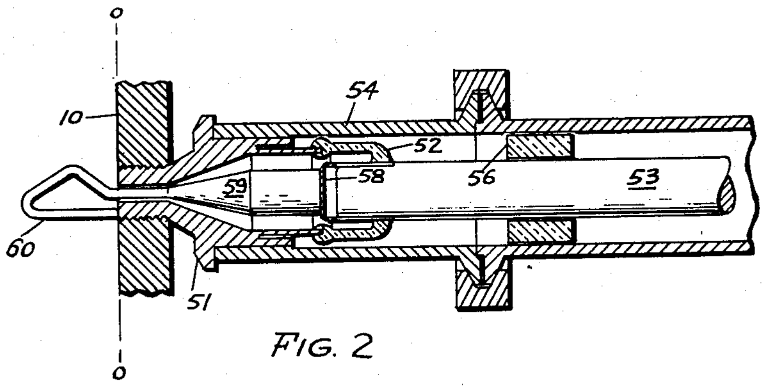
Figs. 2, 3 and 4 show three alternate structures illustrative of other embodiments of the invention.
Figure 3:
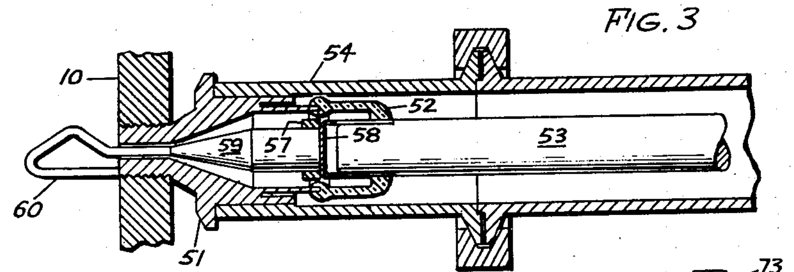

Figs. 2 and 3 show the invention applied to coaxial conductor combinations, each including a tapered output lead 59 whose inner end 60 is looped for union with the anode body 10 of the magnetron, as by soldering the end of the loop 60 to the end surface of a junction fitting 51. Fitting 51 and tube 54 constitute successive parts of the outer conductor, while lead 59, soldered joint 58, and lead 53 constitute successive parts of the inner conductor, held in coaxial relation to outer conductor 54 by dielectric spacer 52 fused to the circular terminal lip of fitting 51.

Figure 4:
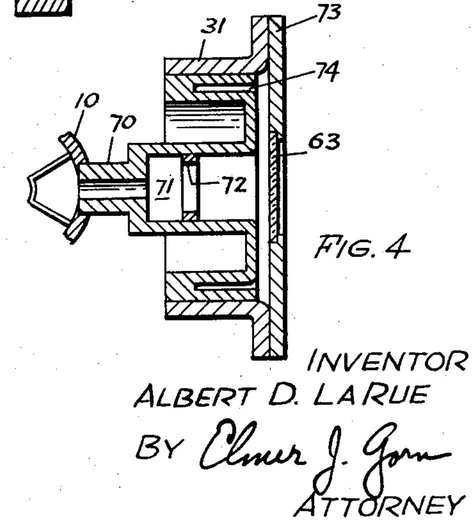

In Fig. 2 the discontinuity ring 56 is located one-half wave length beyond the location point of the comparable ring 57 of Fig. 3, the latter being, in turn, approximately one-half wave length beyond the plane 0—0 marking the point of origin of output coupling. The choice between these two differing locations depends upon diametrical relationships, and a balancing of electrical and mechanical design factors. In one actual installation, the mismatch element 56 of Fig. 2 was located two inches beyond the point of output coupling to a magnetron having an upper frequency setting of 3200 mc./s., with a tunable range down to 2250 mc./s. This location resulted in a substantially constant power output of about 200 watts, with the ring 56 fashioned out of dielectric ceramic material (natural or synthetic stone of aluminum or magnesium silicate composition, such as is marketed under the trade name "Lava," or comparable steatite material, or its equivalent) with a low loss factor on the order of .002, an O.D. of .85", an I.D. of .48", and an axial length of .52", that is, approximately one-eighth of the average wave length. Another installation, using the relative location indicated in Fig. 3, and a copper ring 57 in place of the dielectric ring 56 of Fig. 2, resulted in a substantially constant output comparable to that obtained with the arrangement of Fig. 2. The ring 57 could, of course, be of the same material as the ring 56 of Fig. 2, but the use of copper facilitates its being secured in place, as by soldering to the metallic joint 58.

Where the tuning range is relatively narrow, it may be convenient to use the combination of a quarter-wave transformer section and a coupling zone of uniform cross-section, as indicated at 70 and 71, respectively, in Fig. 4, in lieu of the tapering ramp structure of Fig. 1. In such an arrangement the impedance interruption element could be located as shown at 72. Parts 31 and 63 of Fig. 4 correspond to the similarly designated parts in Fig. 1, except that window 63 of Fig. 4 is supported upon a diaphragm 73 spanning the "choke" area 74 adjacent the outer flanged support 31 of the wave guide assembly. The wave guide will have its longest dimension in a direction normal to the plane of section illustrated in Fig. 4; the same is also true of the wave guide of Fig. 1.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. Means for coupling a tunable oscillation generator to an output path comprising, in combination with said tunable oscillation generator, an output wave guide having operative connection with said generator, said wave guide having a generally uniform impedance pattern, and means including a junction ramp of irregular contour and a discontinuity element positioned in said ramp for varying said impedance pattern abruptly at a predetermined point between said generator and said wave guide, said discontinuity element further being positioned at a point effective to maintain the power output of said generator substantially constant over the tuning range thereof.

2. Means for coupling a tunable oscillation generator having L-C tuning means operatively associated therewith to an output path comprising, in combination with said tunable oscillation generator, an output wave guide having operative connection with said generator, a junction ramp constituting part of said operative connection, and a phase-changing discontinuity element disposed intermediate the ends of said junction ramp, said discontinuity element further being positioned at a point effective to maintain the power output of said generator substantially constant over the tuning range thereof.

3. Means for coupling a tunable oscillation generator having L-C tuning means operatively associated therewith to an output path comprising, in combination with said tunable oscillation generator, an output wave guide having operative connection with said generator, a junction cone constituting part of said operative connection, and an impedance mismatch ring engaging the conical inner periphery of said junction cone, to control the circuit-coupling efficiency of said junction cone, said mismatch ring further being positioned in said cone at a point effective to maintain the power output of said generator substantially constant over the tuning range thereof.

4. Means for coupling a tunable oscillation generator to an output path comprising, in combination with said tunable oscillation generator, an output conductor having a point of junction with said generator, said conductor having a generally uniform impedance pattern, and a phase-changing mis-match element disposed about the periphery of said conductor and responsive to changes in the frequency setting of said generator for varying the coupling efficiency between said generator and said output path in substantially inverse ratio to variations of said frequency setting whereby said element is effective to maintain the power output of said generator substantially constant over the tuning range thereof.

5. Means for coupling a tunable oscillation generator to an output path comprising, in combination with said tunable oscillation generator, a coaxial line including inner and outer conductors, said inner conductor terminating within said generator, said output being related to said inner conductor in a manner to achieve a generally uniform impedance pattern, and an impedance discontinuity element disposed about said inner conductor and responsive to variations in the frequency setting of said generator for varying the coupling efficiency between said generator and said output path in substantially inverse ratio to variations in the frequency setting of said generator whereby said element is effective to maintain the power output of said generator substantially constant over the tuning range thereof.

6. Means for coupling a tunable oscillation generator having L-C tuning means operatively associated therewith to an output path comprising, in combination with said tunable oscillation generator, a coaxial line including inner and outer conductors, said inner conductor terminating within said generator, said outer conductor being related to said inner conductor in a manner to achieve a generally uniform impedance pattern, and an impedance discontinuity element disposed about said inner conductor and responsive to variations in the frequency setting of said generator for varying the coupling efficiency between said generator and said output path in substantially inverse ratio to variations in the frequency setting of said generator whereby said element is effective to maintain the power output of said generator substantially constant over the tuning range thereof.

7. In combination, a tunable oscillation generator, an output path having a point of junction with said generator and including load impedance matching means, and additional means comprising an impedance discontinuity element disposed in said output path and operative to vary the coupling efficiency between said generator and said output path in substantially inverse ratio to variations in the frequency setting of said generator whereby said element is effective to maintain the power output of said generator substantially constant over the tuning range thereof.

References Cited in the file of this patent

UNITED STATES PATENTS

| | | |
|---|---|---|
| 2,523,286 | Fiske et al. | Sept. 26, 1950 |
| 2,523,841 | Nordsieck | Sept. 26, 1950 |
| 2,526,399 | Okress et al. | Oct. 17, 1950 |
| 2,787,711 | Glass | Apr. 12, 1957 |